Figure 3:
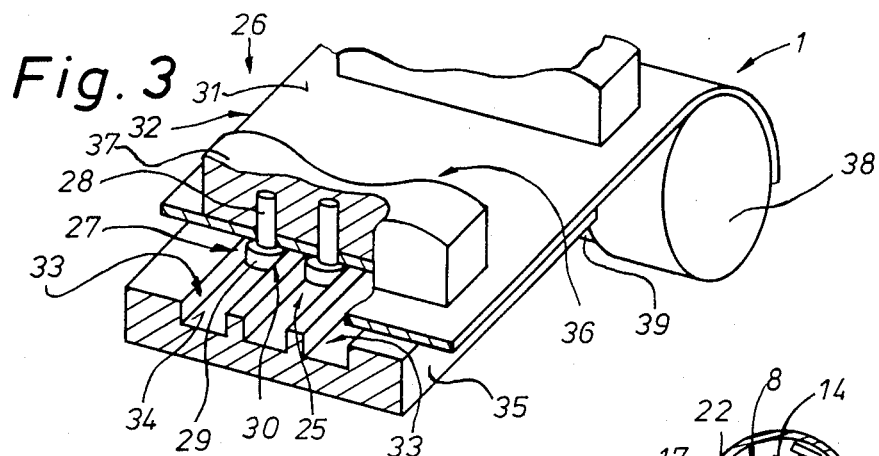

United States Patent [19]

Sticht

[11] Patent Number: 4,860,881
[45] Date of Patent: Aug. 29, 1989

[54] APPARATUS FOR CONVEYING ASSEMBLY PARTS

[75] Inventor: Walter Sticht, Attnang-Puchheim, Austria

[73] Assignee: Stiwa-Fertigungstechnik Sticht GesmbH, Attnang-Puchheim, Austria

[21] Appl. No.: 161,372

[22] Filed: Feb. 22, 1988

Related U.S. Application Data

[63] Continuation of Ser. No. 910,266, Sep. 19, 1986, abandoned, which is a continuation of Ser. No. 823,130, Jan. 27, 1986, abandoned, which is a continuation of Ser. No. 589,737, Mar. 15, 1984, abandoned.

[30] Foreign Application Priority Data

Mar. 29, 1983 [AT] Austria .............................. A 1118/83

[51] Int. Cl.$^4$ ...................... B65G 47/26; B65G 15/44
[52] U.S. Cl. .................................... 198/443; 198/699; 198/840; 198/841; 198/842; 198/816
[58] Field of Search ............... 198/699, 837, 840, 841, 198/813, 816, 698, 806, 835, 842, 690.2, 443

[56] References Cited

U.S. PATENT DOCUMENTS

| | | | |
|---|---|---|---|
| 1,269,960 | 6/1918 | Przednowek | 198/699 |
| 2,439,189 | 4/1948 | Schafroth | 198/841 X |
| 2,810,467 | 10/1957 | Bogaty | 198/692 |
| 3,140,971 | 7/1964 | Crescenzo et al. | 198/837 |
| 3,187,944 | 6/1965 | Stock | 198/837 X |
| 3,294,215 | 12/1966 | Walter | 198/837 X |
| 3,603,450 | 9/1971 | Chamberlain et al. | 198/841 |
| 3,642,119 | 2/1972 | Warwick | 198/840 X |
| 3,724,656 | 4/1973 | Sterling | 198/533 |
| 3,870,142 | 3/1975 | Woltjer | 198/841 |
| 3,882,994 | 5/1975 | Mecks et al. | 198/397 |
| 4,008,801 | 2/1977 | Reilly et al. | 198/837 X |
| 4,222,482 | 9/1980 | Kelley | 198/841 X |

FOREIGN PATENT DOCUMENTS

| | | | |
|---|---|---|---|
| 939798 | 2/1956 | Fed. Rep. of Germany | 198/841 |
| 2275387 | 1/1976 | France | 198/400 |
| 0149647 | 7/1981 | Netherlands | 198/841 |
| 552524 | 8/1974 | Switzerland | |
| 1243008 | 8/1971 | United Kingdom | 198/837 |

OTHER PUBLICATIONS

IBM Technical Disclosure Bulletin, vol. 19, No. 1, Jun. 1976, p. 281.

*Primary Examiner*—Robert J. Spar
*Assistant Examiner*—D. Glenn Dayoan
*Attorney, Agent, or Firm*—Kurt Kelman

[57] ABSTRACT

An apparatus for conveying assembly parts from a storage bin to a singling and/or orienting station has a conveyor which includes an endless carrier extending from an inlet in the bin to a discharge end whence the conveyed assembly parts are thrown from the carrier. The carrier is driven in an endless path about a reversing point at the discharge end and entrainment elements on the carrier entrain the assembly parts from the inlet to the discharge end in a conveying direction. A support defining a guide track in the conveying direction extends under the carrier and guide elements on a side of the carrier facing the support engage the guide track whereby the guide track and the guide elements constitute a guide for the endless carrier in the conveying direction.

6 Claims, 1 Drawing Sheet

APPARATUS FOR CONVEYING ASSEMBLY PARTS

This is a continuation of my copending application Ser. No. 910,266, filed Sept. 19, 1986 and now abandoned, which is a continuation of my abandoned applications Ser. Nos. 823,130, filed Jan. 27, 1986, and 589,737, filed Mar. 15, 1984.

The present invention relates to an apparatus for conveying assembly parts from a storage container to a singling and/or orienting device for the assembly parts.

In my U.S. patent application Ser. No. 306,096, filed Sept. 25, 1981 and replaced by continuation application Ser. No. 659,040, filed Oct. 10, 1984, I have disclosed such a conveying apparatus with a conveyor including an endless carrier for the assembly parts extending from an inlet end in the storage container to a discharge end whence the conveyed assembly parts are thrown from the carrier onto the singling device. The endless carrier is driven in an endless path about a reversing point at the discharge end, and entrainment elements on the endless carrier entrain the assembly parts from the inlet to the discharge end in a conveying direction. The entrainment elements serve as a loosening device for the assembly parts removed thereby from the storage container. By arranging two sequentially arranged loosening devices constituted by mechanical entrainment elements at the inlet end, clusters of entangled assembly parts can be singled as they are removed by the conveyor from the storage container so that they are conveyed to the discharge end in singled condition. This apparatus has, therefore, been commercially used with great success but, for some types of assembly parts, it does not operate quite satisfactorily.

It is the primary object of this invention to improve such a conveying apparatus in a manner enabling the assembly parts to be conveyed from the storage container at a steady throughput and without damage to even fragile parts, including assembly parts which tend to be readily entangled and to form entangled clusters.

The above and other objects are accomplished according to the invention with a support for the endless carrier extending between the inlet and discharge ends, the support defining a guide track extending in the conveying direction, and guide elements engaging the guide track whereby the guide track and the guide elements constitute a guide for the endless carrier in the conveying direction.

This unexpectedly simple arrangement of placing a support below the course of the endless conveyor carrier leading from the inlet to the discharge end and providing a guide therefor assures a firm, oscillation-free vertical and lateral guidance of the endless carrier. This prevents jamming of the assembly parts as they are lifted out of the storage container by the entrainment elements and the steady guidance of the carrier prevents the entrained assembly parts from gliding off the entrainment elements and/or the carrier and falling back into the storage container as the assembly parts are transported upwards from the inlet end to the discharge end. In addition, the support will relieve the carrier of at least a part of the weight of the assembly parts, which is particularly important if the same are relatively heavy, since this weight will be absorbed by the underlying support. Also, the force driving the endless carrier in the conveying direction may be better used for disentangling any entangled parts at the inlet end because the carrier may not be displaced laterally, i.e. transversely to the conveying direction, during such disentanglement.

Figure 1:
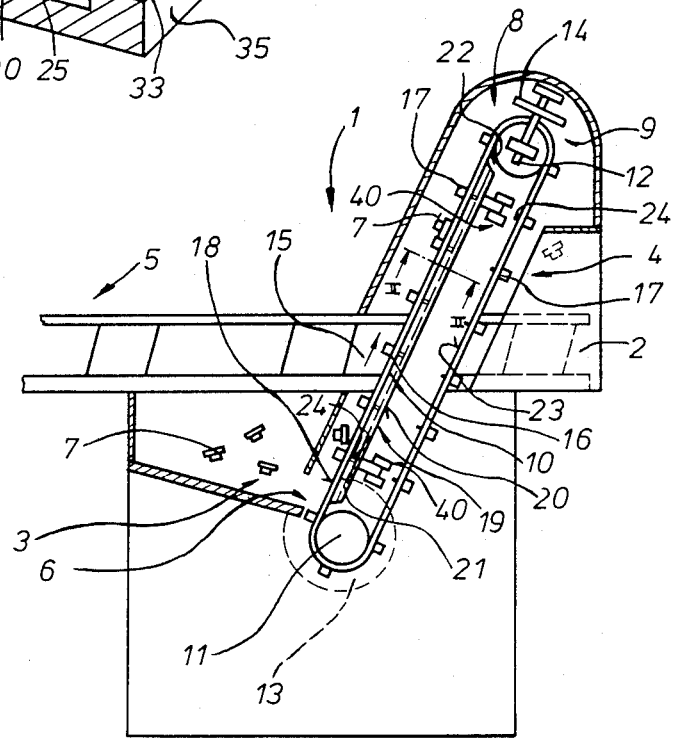
Figure 2:
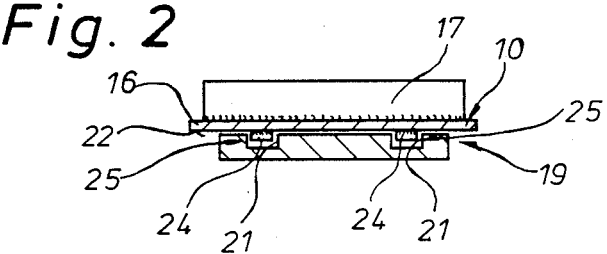

The above and other objects, advantages and features of the present invention will become more apparent from the following detailed description of certain now preferred embodiments thereof, taken in conjunction with the generally schematic drawing wherein FIG. 1 is a side elevational view of a conveying apparatus according to this invention, with the front side wall of the casing removed to show the operating parts;

FIG. 2 is an end view of the conveyor, partly in section along line II—II of FIG. 1; and FIG. 3 is a fragmentary perspective view of another embodiment of the conveyor.

Referring now to the drawing and first to FIG. 1, there is shown apparatus 1 for conveying assembly parts 7 from storage container 3 to singling and orienting device 5 for the assembly parts. Apparatus 1 comprises conveyor 4 including endless carrier 10 for assembly parts 7 extending from inlet end 6 in the storage container to discharge end 9 whence the conveyed assembly parts are thrown from carrier 10 onto singling device 5. Means including reversing rollers 11, 12 drives endless carrier 10 in an endless path about reversing point 8 at discharge end 9, drive motor 13 being coupled to roller 11, for example by an elastic transmission. Entrainment elements constituted by transverse webs 17 on endless carrier 10 entrain assembly parts 7 on the endless carrier from the inlet to the discharge end in a conveying direction indicated by arrow 5. Support 19 for endless carrier 10 extends between the inlet and discharge ends, and the support defines guide track 21 in course 18 of carrier 10 extending in the conveying direction. Guide elements 24 on side 22 of carrier 10 facing support 19 engage guide track 21 whereby the guide track and guide elements constitute guide 25 for the endless carrier in the conveying direction. Means 27 detachably fasten entrainment elements to the endless carrier.

In the illustrated embodiments, the support for the endless carrier is constituted by plate 20. The endless carrier may be constituted by an elastic conveyor belt and means 14 is arranged for adjusting the position of reversing roller 12 in relation to reversing roller 11 to change the distance therebetween and between roller 12 and support plate 20 so as to hold the elastic conveyor belt under a desired tension. This will assure a continuous, impact-free guidance of the endless carrier through the entire conveying range of the assembly parts from the inlet to the discharge end. Illustrated adjusting means 14 comprises two set screws extending in the direction of arrow 15. Any other type of mechanical, pneumatic or like adjusting means may be used.

As shown, the apparatus is encased in casing 2 wherein reversing rollers 11, 12 and support 19 are mounted independently of each other. Means 40 adjustably mount support plate 20 on casing 2 to enable the support plate to be displaced perpendicularly as well as laterally in relation to endless carrier 10. In this manner, the guide for the carrier may be adjusted exactly to the prevalent operating conditions, for example to take into account the weight of the assembly parts to be conveyed by adjusting the distance between the carrier and the underlying support.

FIG. 2 more clearly shows guide 25 comprised of two parallel guide grooves 24 defined in support 19 and engaged by guide elements 24 projecting from facing sides 22 and 23 of the two courses of endless conveyor belt 16. The guide elements may be mechanically fastened to the endless carrier or, if this carrier is a belt of rubber or the like, they may be vulcanized to the belt or otherwise suitably bonded thereto.

Entrainment elements 17 are arranged on endless carrier 10 on the outside thereof opposite to facing insides 22, 23. These entrainment elements may assume different shapes adapted to the assembly parts to be processed and they may be of elastic or rigid material. For example, instead of using transverse webs of the type illustrated in FIG. 2, the entrainment elements may consist of individual blocks, hooks or brushes and the like, or the outside of the endless carrier may simply be so configured as to present entrainment means for the assembly parts as the endless carrier is driven past the assembly parts in the storage container at the inlet end.

In conveying apparatus 1 illustrated in FIG. 3, conveyor 26 includes endless carrier 32 constituted by conveyor belt 31 and entrainment elements 36 constituted by webs 37. Only one of the reversing rollers 38 over which the conveyor belt is trained is shown in this figure. Guide 25 is constituted by guide tracks 33 constituted by grooves 34 in support 35 and guide elements 30 constituted by means 27 for detachably fastening the entrainment elements to the endless carrier. The illustrated fastening means are constituted by screws 28 having hexagonal heads 29 engaging guide grooves 34. Using an elastic belt as carrier enables the intrinsic elasticity of the carrier to be utilized as an additional damper for absorbing the forceful impulses or accelerations imparted to the assembly parts at the inlet end by the driven conveyor or the disentanglement of the parts. The use of the fastening means for the entrainment elements as part of the guide of the endless carrier has the advantage that the stresses to which the carrier may be subjected at the inlet end when entangled assembly parts are lifted out of the storage container by the entrainment elements are transmitted directly to the guide track.

As shown in FIG. 3, entrainment elements 36 are webs 37 with an undulating surface extending in the direction of elongation of the webs so that these webs will exert different forces along the web elongation upon the assembly parts in the storage container as the webs are driven through these parts at the inlet end so that individual parts may be lifted out of a cluster of entangled parts during this movement whereby the entrainment elements operate as singling means.

The guide for the endless carrier assures an exact lateral guidance thereof in the conveying direction. Since the carrier is driven along the support from the inlet to the discharge end, it can carry heavy parts upwardly to the discharge end and the carrier will not be vertically or laterally displaced during the operation of the conveyor.

Reversing roller 38 is shown to define circumferential grooves 39 aligned with guide grooves 34 in support 35. This assures an exact guidance of the endless carrier at the reversing point so that lateral displacements of the carrier due to vibrations of the drive motor or the like are securely avoided because the tension of the carrier is suitably adjusted.

The endless carrier used in the conveyor may be a band of any suitable material, such as conveyor belts of synthetic resin fibers, of natural or synthetic rubber, of metal members and the like. The support may be a metal plate, such as a plate of hardened metal to increase its resistance to wear, a plate of a suitable rigid synthetic resin, such as "Teflon", or the like. The reversing rollers over which the endless carrier is trained may consist of like materials. If self-lubricating synthetic resins are used, the guide will be operative for a long time and no special lubricants, which may cause unwanted friction between the carrier and the reversing rollers, will be needed.

A conveying apparatus of the described structure may be used in the processing of all kinds of parts, particularly assembly parts tending to become entangled. It will be very effective for disentangling and conveying coiled springs, heavily entangled sheet metal parts or safety rings, discs or the like. The exact and firm guidance of the carrier for the assembly parts in a lateral and a vertical direction assures the uniform removal of the parts through the outlet of the storage container. As the carrier passes upwardly therethrough, singled parts are "brushed out" of entangled clusters of the parts and are entrained towards the discharge end by the entrainment elements on the carrier. The steady run of the firmly guided carrier prevents the entrained parts, which may already be singled or still be somewhat entangled in small clusters, from gliding and falling off the carrier during the upward conveyance thereof.

If desired, the support may be a magnetic metal plate if the assembly parts are of a magnetic metal, thus further holding the parts on the carrier.

Any suitable material may be used for the entrainment elements. For example, they may be made of a material which enables the entrainment elements to be bonded to the carrier by an adhesive or to be vulcanized thereto. On the other hand, they may be made of a synthetic resin or metal and may be detachably fastened to the carrier by screws or the like.

What is claimed is:

1. An apparatus for conveying assembly parts from a storage container to a singling device for the assembly parts, which comprises a conveyor including
   (a) an endless elastic carrier for the assembly parts ascending from an inlet end in the storage container to a discharge end whence the conveyed assembly parts are thrown from the carrier onto the singling device,
   (b) means for driving the endless carrier in an endless path about reversing rollers at the inlet and discharge ends,
   (c) entrainment elements on one side of the endless carrier for entraining the assembly parts from the inlet to the discharge end in a conveying direction, the entrainment elements being spaced from each other in the conveying direction and extending transversely thereto,
   (d) a support plate in supporting contact with the endless carrier extending in the conveying direction between the rollers, the support plate facing and extending over substantially the entire width of a side of the endless elastic carrier opposite the one side and defining a guide track for the carrier extending in the conveying direction between the rollers,
      (1) the guide track being constituted by a plurality of transversely spaced guide grooves in the support plate and the rollers defining grooves aligned with the guide grooves in the support plate, (e) means adjustably mounting the plate for displacement perpendicularly and laterally in relation to the endless elastic carrier, and
(f) a plurality of individual guide elements on the opposite side of the carrier, the guide elements being spaced from each other in the conveying direction and engaging the guide grooves along the entire length thereof whereby the guide track and the guide elements constitute a guide for the endless carrier in the conveying direction and prevent displacement of the endless carrier transversely to the conveying direction,
  (1) respective ones of the entrainment elements and respective ones of the guide elements having the same spacing in the conveying direction whereby all the entrainment elements are aligned with respective guide elements, and
  (2) the entrainment elements extending transversely over at least two adjacent ones of the guide grooves.

2. The apparatus of claim 1, further comprising means for detachably fastening the entrainment elements to the endless carrier.

3. The apparatus of claim 2, wherein the guide elements are constituted by the means for detachably fastening the entrainment elements to the endless carrier.

4. The apparatus of claim 1, further comprising means for adjusting the position of one of the reversing rollers in relation to the other roller to change the distance therebetween and between the one adjusted roller and the plate.

5. The apparatus of claim 4, further comprising a casing wherein the reversing rollers and the support plate are mounted independently of each other.

6. The apparatus of claim 1, wherein the endless carrier is a conveyor belt.

* * * * *